US012315368B2

(12) United States Patent
Aronovich et al.

(10) Patent No.: US 12,315,368 B2
(45) Date of Patent: May 27, 2025

(54) DYNAMIC TRAFFIC SIGNAL OPTIMIZATION USING RECEIVED VEHICLE INFORMATION

(71) Applicant: International Business Machines Corporation, Armonk, NY (US)

(72) Inventors: Lior Aronovich, Thornhill (CA); Stephen Haertel, Ajax (CA)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 17/542,469

(22) Filed: Dec. 5, 2021

(65) Prior Publication Data

US 2023/0177953 A1 Jun. 8, 2023

(51) Int. Cl.

*G08G 1/07* (2006.01)
*G08G 1/01* (2006.01)
*G08G 1/095* (2006.01)

(52) U.S. Cl.

CPC ......... *G08G 1/0145* (2013.01); *G08G 1/0116* (2013.01); *G08G 1/0133* (2013.01); *G08G 1/095* (2013.01)

(58) Field of Classification Search

CPC .. G08G 1/0145; G08G 1/0116; G08G 1/0133; G08G 1/095; G08G 1/0112; G08G 1/08; G08G 1/087
USPC ......................... 340/916, 917, 918, 907, 910
See application file for complete search history.

(56) References Cited

U.S. PATENT DOCUMENTS 6,072,406 A 6/2000 Leonard
8,559,673 B2 10/2013 Fairfield
(Continued)

FOREIGN PATENT DOCUMENTS

CN 104575035 A 4/2015
CN 106384519 A 2/2017
(Continued)

OTHER PUBLICATIONS

"Method and System for Dynamically Changing Traffic Lights based on Incoming Vehicle Information", IP.com No. IPCOM000235740D, IP.com Electronic Publication Date: Mar. 24, 2014, 3 pps., <https://priorart.ip.com/PCOM/000235740>.
(Continued)

*Primary Examiner* — Anh V La
(74) *Attorney, Agent, or Firm* — Tihon Poltavets

(57) ABSTRACT

A set of incoming lanes are identified within a pre-determined proximity of a traffic signal as candidate lanes to receive a go-signal from the traffic signal. A prioritized overall lane wait time is calculated for each incoming lane. Selected lanes receive the go-signal in the current iteration, based on the prioritized overall lane wait time. An amount of time to allocate to the go-signal is calculated, based on the number of vehicles to flush from the selected lanes. The go-signal is presented to the selected lanes for the allocated time, including non-conflicting lanes. A set of metrics are collected including throughput of vehicles leaving the pre-determined proximity of the traffic signal. Based on the metrics, a time allocation is determined for the next iteration of the go-signal, parameters are updated for the prioritized overall lane wait time, and the next iteration of the traffic signal is initiated.

20 Claims, 3 Drawing Sheets

(56) References Cited

U.S. PATENT DOCUMENTS

| | | | | |
|---|---|---|---|---|
| 8,928,493 | B2 | 1/2015 | Mantalvanos | |
| 9,707,960 | B2 | 7/2017 | Gutmann | |
| 9,773,411 | B2 | 9/2017 | Popple | |
| 9,805,595 | B1 | 10/2017 | Liebinger Portela | |
| 9,965,951 | B1 * | 5/2018 | Gallagher | G08G 1/065 |
| 2005/0104745 | A1 | 5/2005 | Bachelder | |
| 2009/0167562 | A1 | 7/2009 | Liang | |
| 2011/0181440 | A1 | 7/2011 | Bunz | |
| 2016/0019784 | A1 | 1/2016 | Peri | |
| 2017/0124869 | A1 * | 5/2017 | Popple | G08G 1/087 |
| 2018/0005521 | A1 | 1/2018 | Ryu | |
| 2018/0096595 | A1 * | 4/2018 | Janzen | G06V 10/94 |
| 2018/0204450 | A1 | 7/2018 | Song et al. | |
| 2020/0242922 | A1 | 7/2020 | Dulberg et al. | |
| 2020/0372793 | A1 * | 11/2020 | Weizman | G08G 1/0112 |

FOREIGN PATENT DOCUMENTS

| | | | |
|---|---|---|---|
| CN | 105206070 | B | 12/2017 |
| CN | 105303848 | B | 1/2018 |
| CN | 112185135 | A | 1/2021 |
| CN | 113335292 | A | 9/2021 |
| WO | 2007008837 | A2 | 1/2007 |
| WO | 2018215833 | A1 | 11/2018 |

OTHER PUBLICATIONS

"Traffic light to prevent intersection blockage", IP.com No. IPCOM000260419D IP.com Electronic Publication Date: Nov. 19, 2019, 3 pps., <https://priorart.ip.com/IPCOM/000260419>.

Chen et al., "Dynamic Traffic Light Optimization and Control System using Model-Predictive Control Method", Conference Paper, Nov. 2016, ResearchGate, 7 pps., <https://www.researchgate.net/publication/311918553>.

Liang et al., "A Deep Reinforcement Learning Network for Traffic Light Cycle Control", IEEE Transactions On Vehicular Technology, vol. 68, No. 2, Feb. 2019, 1 pps., <https://web.njit.edu/~gwang/papers/2019ITVT.pdf>.

Lu et al., "Traffic Lights Dynamic Timing Algorithm Based on Reinforcement Learning", Springer International Publishing AG 2018, Proceedings of the Eleventh International Conference on Management Science and Engineering Management, Lecture Notes on Multidisciplinary Industrial Engineering, 10 pps., <https://www.researchgate.net/publication/318164561>.

Steingrover et al., "Reinforcement Learning of Traffic Light Controllers Adapting to Traffic Congestion", Jan. 2005, SourceDBLP, Conference: BNAIC 2005—Proceedings of the Seventeenth Belgium-Netherlands Conference on Artificial Intelligence, Brussels, Belgium, Oct. 17-18, 2005, 8 pps., <https://www.researchgate.net/publication/220799939>.

Wen et al., "A dynamic and automatic traffic light control system for solving the road congestion problem", Urban Transport XII: Urban Transport and the Environment in the 21st Century 307, 10 pps., WIT Transactions on The Built Environment, vol. 89, © 2006 WIT Press, 10 pps., <https://www.witpress.com/Secure/elibrary/papers/UT06/UT06031FU1.pdf>.

International Search Report and Written Opinion dated Dec. 15, 2022 for International Application No. PCT/CN2022/124010 filed Oct. 9, 2022, 10 pps.

* cited by examiner

DYNAMIC TRAFFIC SIGNAL OPTIMIZATION USING RECEIVED VEHICLE INFORMATION

BACKGROUND

The present invention relates to vehicle traffic management, and more specifically, to dynamic control of a traffic signaling device (i.e., traffic signal) based on information received from and regarding the vehicles within a pre-determined proximity of the traffic signal.

Management of vehicle traffic flow in areas in which roadways intersect often relies on stop signs for low traffic volumes, in which one or both roadways must come to a complete stop and proceed by established rules-of-the-road priorities. In other cases, roadway intersections with higher traffic flow and multiple lanes per direction utilize traffic signals that indicate by colored light, light patterns, sound sequence, or other signals when a traffic lane must stop having received a "stop-signal," or proceed having received a "go-signal". Traffic flow can change and be affected by increased vehicle count due to population growth in an area over time, weather conditions, detours, accidents, local events, time of day, and day of the week.

Traffic signals operate with static programs, sometimes based on a statistical analysis of past traffic flow, that maintain consistent operational timing. In some cases, a traffic signal's timing may be programmed differently for different times of the day, but it lacks responsiveness to dynamic changes.

SUMMARY

A computer-implemented process for dynamically optimizing traffic flow. The method provides for one or more processors to detect vehicles within a pre-determined proximity of a traffic signal. The one or more processors identify a set of incoming lanes as candidate lanes to receive a go-signal from the traffic signal. The one or more processors calculate a prioritized overall lane wait time for each incoming lane associated with the traffic signal. The one or more processors select lanes to receive the go-signal in a current iteration, based on the prioritized overall lane wait time and the candidate lanes. The one or more processors calculate an amount of time to allocate to the go-signal, based on a number of vehicles to flush from the selected lanes. The one or more processors present the go-signal and the allocated time to the selected lanes and include lanes that are non-conflicting with the selected lanes. The one or more processors collect a set of metrics based on monitoring throughput of vehicles leaving the predetermined proximity of the traffic signal. The one or more processors determine the time to allocate to the go-signal in the next iteration of the traffic signal, based on a collection of metrics and updating parameters associated with the prioritized overall lane wait time, and the one or more processors initiate the next iteration of the traffic signal.

DETAILED DESCRIPTION

Figure 1:
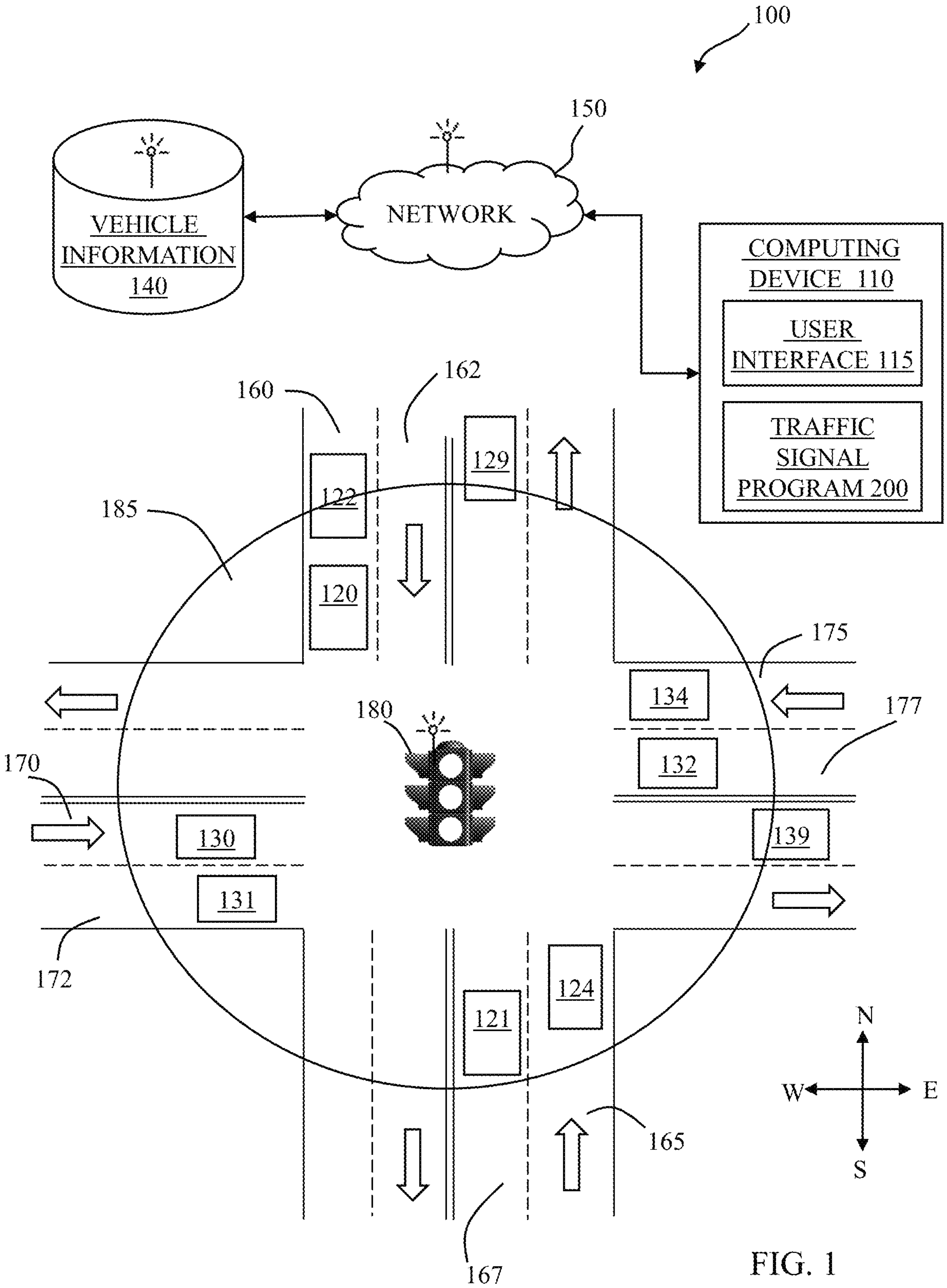
FIG. 1 is a functional block diagram illustrating a distributed data processing environment, in accordance with an embodiment of the present invention.

Embodiments of the present invention recognize many scenarios in which traffic signals utilize static timing to manage traffic, resulting in poorly optimized traffic flow, unnecessary delays, and frustrated drivers and passengers. A relatable example includes a situation in which vehicles wait at a traffic signal, while there are no vehicles occupying or approaching the lanes of the traffic signal that currently have a go-signal. The waiting vehicles wait until the static timing presents a go-signal for the waiting vehicles lane. Embodiments recognize that current traffic signal configurations may lack the ability to respond to dynamically changing conditions. Embodiments further recognize that highly congested traffic in all lane directions cannot rely on current traffic signals to focus relief on one lane that has significantly more buildup than other lanes. Embodiments recognize that providing priority and extended go-signal time to the lanes with more traffic build-up will reduce the overall wait time for vehicles, reduce congestion, and balance traffic flow over time.

Embodiments of the present invention recognize that traffic flow management marking for an intersection includes an area or zone within a pre-determined proximity of a traffic signal. Embodiments provide a method for optimizing the overall wait time of vehicles within a proximity of a traffic signal by dynamic responsiveness of the traffic signal. Embodiments of the present invention improve traffic flow within the pre-determined proximity of the traffic signal based on optimizing a target function associated with the vehicles and lanes within the zone.

Embodiments of the present invention refer to the pre-determined area of proximity to the traffic signal as an optimization zone. Embodiments further refer to lanes leading into the optimization zone towards the traffic signal as incoming lanes, and lanes leading away from the traffic signal and out of the optimization zone as exiting lanes. Embodiments consider all vehicles within the optimization zone are bound to pass through the traffic signal associated with the optimization zone, which corresponds to a vehicle traveling from an incoming lane to an exiting lane during a go-signal provided to the incoming lane. Vehicles responding to a go-signal and traveling through the intersection associated with the traffic signal and exiting the optimization zone via an exiting lane are referred to as "passing through the traffic signal." Vehicles anticipated or monitored as passing through the traffic signal (or the optimization zone) are herein referred to as "flushed", "flushed vehicles," "vehicles to flush," or "vehicles having been flushed."

Embodiments recognize that the traffic signal directs a go-signal to designated lanes for an allotted period of time during an iteration of the traffic signal. For each iteration, embodiments of the present invention determine one or more incoming lanes selected to receive a go-signal, and embodiments calculate an allotment of time for the go-signal. Embodiments calculate a prioritized overall lane wait time for the incoming lanes of the optimization zone, based on the prioritized wait times of the vehicles within the respective lane and the lane's priority proportion of all lanes. Embodiments select lanes to receive the go-signal in the current iteration based on the prioritized overall wait time of incoming lanes. Additionally, embodiments calculate the allotted time to provide the go-signal based on the number of vehicles anticipated to be flushed in the current iteration from the selected lane(s). In some embodiments, a go-signal time function determines the allotted go-signal time by receiving a number of vehicles as input (to be flushed from lanes) and returning a time to allot for the go-signal. The go-signal time function uses a pre-determined time required for a vehicle type to pass through the traffic signal. Examples of vehicle type include, but are not limited to, passenger vehicles (ie., cars, SUVs, pickup trucks), public transit vehicles (i.e., buses, taxis, coach vehicles, larger capacity vehicles), utility vehicles (i.e., trucks and vehicles working on electric, water supply, and gas line utilities, and roadways), and emergency vehicles (fire-fighting vehicles, law enforcement vehicles, ambulances, and rescue vehicles).

Embodiments apply the go-signal to the selected lane(s) and may include additional lanes that do not conflict with the traffic flow of the selected lane(s). Subsequent to the expiration of the go-signal time allotment, embodiments collect metrics and update parameters and functions for the next iteration of the traffic signal. Embodiments include detection and response to emergency vehicles in incoming lanes of the optimization zone and prioritize flushing of the emergency vehicles from their respective lanes.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FIG. 1 includes computing device 110, passenger vehicles 120, 121, 130, and 131, public transit vehicles 122 and 132, emergency vehicles 124 and 134, exiting vehicles 129 and 139, vehicle information 140, and traffic signal 180, all connected through network 150. FIG. 1 also includes lanes 160, 162, 165, 167, 170, 172, 175, and 177, and optimization zone 185.

Computing device 110 includes user interface 115, and traffic optimization program 200. In some embodiments, computing device 110 can be a blade server, a web server, a laptop computer, a desktop computer, a standalone mobile computing device, a smartphone, a tablet computer, or another electronic device or computing system capable of receiving, sending, and processing data. In other embodiments, computing device 110 may be a wearable item or be included in a wearable item of a user. In still other embodiments, computing device 110 may be a computing device interacting with applications and services hosted and operating in a cloud computing environment. In another embodiment, the computing device 110 can be a netbook computer, a personal digital assistant (PDA), or other programmable electronic devices capable of receiving data from and communicating with vehicle information 140, traffic signal 180, passenger vehicles 120, 121, 130, and 131, public transit vehicles 122, and 132, and emergency vehicles 124 and 134. Computing device 110 includes the capability to communicate with other devices of distributed computer processing environment 100 (not shown), via network 150, as well as hosting the operation of traffic optimization program 200. Alternatively, in some embodiments, computing device 110 may be communicatively connected to traffic optimization program 200, operating remotely. Computing device 110 may include internal and external hardware components, depicted in more detail in FIG. 3.

User interface 115 provides an interface to access the features and functions of computing device 110. In some embodiments of the present invention, user interface 115 provides access to operate and select options for traffic optimization program 200. User Interface 115 may also provide a display of output for functions and applications of computing device 110. User interface 115 of computing device 110 enables the user of computing device 110 to access additional features and functions of computing device 110 (not shown).

User interface 115 supports access to alerts, notifications, and provides access to forms of communications. In one embodiment, user interface 115 may be a graphical user interface (GUI) or web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also include mobile application software that provides respective interfaces to features and functions of computing device 110. User interface 115 enables respective users of computing device 110 to receive, view, hear, and respond to input, access applications, display content of online conversational exchanges, and perform available functions.

Optimization zone 185 includes passenger vehicles 120, 121, 130, and 131, public transit vehicles 122 and 132, and emergency vehicles 124 and 134 positioned on incoming lanes and waiting for a go-signal from traffic signal 180. Passenger vehicles 120, 121, 130, and 131, public transit vehicles 122 and 132, and emergency vehicles 124 and 134 include configurations to wirelessly transmit data (not shown on vehicle representations) to traffic optimization program 200 operating on computing device 110, via network 150.

The vehicle data transmitted to traffic optimization program 200 includes, but is not limited to, identification of the vehicle, information regarding the type of vehicle, the speed and direction of travel of the vehicle, the position of the vehicle in the optimization zone, the proximity of the vehicle to traffic signal 180, the number of occupants in the vehicle, time entering the optimization zone, position within the optimization zone, travel direction, speed, and a priority weight the vehicle may have. The respective vehicle information received by traffic optimization program 200 results from data transmission from one or more of camera sensors, infrared sensors, radar detection sensors, an application (app) operating on the vehicle's computer, and from user input from an app on the user's mobile device, or other sources of detection. Vehicles may include transponders that transmit respective vehicle data wirelessly upon entering the optimization zone, and traffic optimization program 200 receives the online transmitted data. Online receipt refers to a "no-delay" involving staging or storage during transmission, providing real-time dynamic calculations and determinations for optimizing the overall wait time of vehicles in the optimization zone.

Vehicles accrue a wait time while in an incoming lane of optimization zone 185, and vehicles include a priority proportion based on vehicle type, number of occupants of the vehicle, and optional payments made by the vehicle owner or occupant to receive elevated priority status, and any combination of these aspects. A priority proportion for a vehicle provides a weighting factor and has a range from zero (0) to one (1). The priority proportions can be determined in part or in whole based on vehicle types. For example, passenger vehicles may have a priority proportion of 0.1; municipal, government, and security vehicles may have a priority proportion of 0.3; public transport vehicles 122 and 132 may have a priority proportion of 0.6; and emergency vehicles 124 and 134 may have a priority proportion of 0.8. Additionally, the number of occupants in a vehicle may determine in part or in whole the priority proportion. An example of occupancy priority proportion calculation may be [number of occupants in a vehicle]/[number of people in the lane] (or a divisor may be 'number of people in the optimization zone'). In some embodiments, a vehicle priority proportion may be further modified by an occupant (or owner) of a vehicle paying an amount to increase the vehicle's priority proportion, within an allowable range. In some embodiments, certain vehicle types are assigned pre-configured values for priority proportion regardless of the number of occupants, such as municipal, utility, and emergency vehicles.

Lanes 160 and 162 provide incoming lanes to optimization zone 185 and traffic signal 180 in a North to South direction. Lane 160 depicts passenger vehicle 120 and public transit vehicle 122 waiting to travel South on lane 160. Lanes 165 and 167 provide incoming lanes to optimization zone 185 and traffic signal 180 in a South to North direction. Lane 165 depicts emergency vehicle 124 and lane 167 depicts passenger vehicle 121 waiting to travel North. Lanes 170 and 172 provide incoming lanes to optimization zone 185 and traffic signal 180 in a West to East direction. Lanes 175 and 177 provide incoming lanes to optimization zone 185 and traffic signal 180 in an East to West direction. Lane 170 depicts passenger vehicle 130 and lane 172 depicts passenger vehicle 131, both waiting to travel East. Lane 170 also depicts exiting vehicle 139 that has passed through (i.e., leaving) optimization zone 185. Lane 175 depicts emergency vehicle 134 and lane 177 depicts public transit vehicle 132 waiting to travel West on their respective lanes.

Exiting vehicles 129, 139 are vehicles that have passed through optimization zone 185 after receiving a go-signal in respective lanes 167 and 170 in a previous iteration of traffic signal 180 selecting and presenting a go-signal.

Vehicle information 140 receives copies of transmitted vehicle data as well as calculations and determinations by traffic optimization program 200, which serves as a historic record and enables reference and learning to continually improve lane selections, improve accuracy in determining the number of vehicles to flush, and improve allotted go-signal time determination. In some embodiments, traffic signal 180 includes vehicle information 140 as a component, whereas in other embodiments, computing device 110 includes vehicle information 140 as an operational component. In yet other embodiments, vehicle information 140 communicates as a remote repository with computing device 110 and traffic optimization program 200 via network 150. Vehicle information 140 includes data from and regarding vehicles in respective lanes of optimization zone 185 as well as calculations, selections, collection of metrics, and determinations performed by traffic optimization program 200 for each iteration of traffic signal 180.

Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support communication and data transmission between passenger vehicles 120, 121, 130, 131, public transit vehicles 122, 132, emergency vehicles 124 and 134, exiting vehicles 129 and 139, computing device 110, vehicle information 140 and traffic signal 180, and other devices and elements of distributed computer processing environment 100 (not shown).

Traffic signal 180 receives lane selection and go-signal time duration from traffic optimization program 200. Traffic signal 180 provides go-signals to incoming lanes of optimization zone 185. In some embodiments traffic signal 180 includes computing device 110 from which traffic optimization program 200 operates. In other embodiments, traffic signal 180 communicates remotely with traffic optimization program 200 and computing device 110 and receives lane selection and go-signal time allocation via network 150. In some embodiments, the configuration of traffic signal 180 includes enabling go-signaling for lanes 160, 162, 165, 167, 170, 172, 175, and 177, independently or in combinations that prevent conflict of go-signaling and optimizes the traffic flow within optimization zone 185.

Optimization zone 185 includes an area of pre-determined proximity to traffic signal 180. FIG. 1 depicts optimization zone 185 as having a circular shape, however, embodiments do not limit the shape or extent of optimization zone 185. In some embodiments, optimization zone 185 extends to a point consistent with vehicle lane flushing supported by a maximum go-signal allotted time. Embodiments may limit the extent and shape of optimizing zone 185 based on wireless transmission range and sensor detection capability of vehicle information, such as vehicle type, number of occupants, and priorities attained by respective vehicles, such as payment of a priority fee.

FIG. 1 depicts traffic optimization program 200 as operating on computing device 110. In some embodiments traffic optimization program 200 may operate remotely, communicatively connected to computing device 110. In some embodiments, traffic optimization program 200 and computing device 110 may be components of traffic signal 180. Traffic optimization program 200 selects one or more incoming lanes of optimization zone 185 to receive a go-signal in a current iteration of traffic signal 180 and determines a time allotment for the go-signal.

Traffic optimization program 200 determines wait times for all vehicles in all lanes within optimization zone 185. Traffic optimization program 200 determines an overall lane wait time for each of the incoming lanes of optimization zone 185 by calculating a prioritized vehicle wait time for each vehicle in a lane, which includes the product of the vehicle wait time and priority proportion, and aggregating the prioritized vehicle wait times of the vehicles in the lane. Traffic optimization program 200 further determines a prioritized overall lane wait time for each of the incoming lanes of optimization zone 185 by combining the overall lane wait time of a lane with the lane's priority proportion. Traffic optimization program 200 selects the lane with the highest value of prioritized overall lane wait time to receive the go-signal.

Traffic optimization program 200 determines the duration of time of presenting the selected lane the go-signal. Traffic optimization program 200 determines the number of vehicles to flush from the selected lane, and in some embodiments, the determined number of vehicles to flush from the selected lane can be used to determine the go-signal duration time. Traffic optimization program 200 provides the go-signal to the selected lane and performs observation of the number of vehicles passing through traffic signal 180 to an exit lane, collects metrics, and updates parameters in preparation for the subsequent iteration of traffic signal 180.

Figure 2:
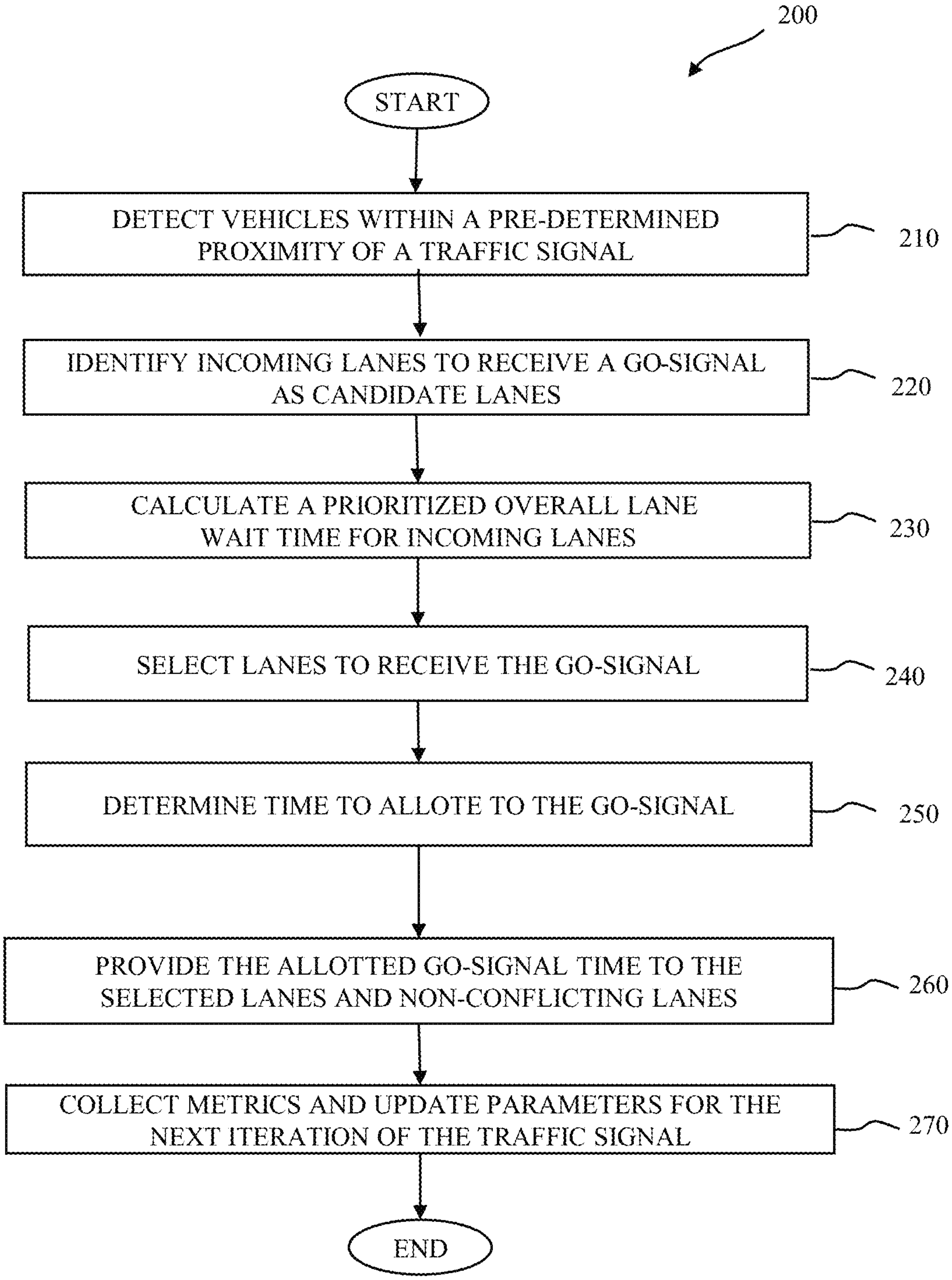
FIG. 2 depicts a flowchart of the operational steps of a traffic optimization program, in accordance with an embodiment of the present invention.

FIG. 2 depicts a flowchart of the operational steps of traffic optimization program 200, in accordance with an embodiment of the present invention. Traffic optimization program 200 operates in conjunction with a traffic signal device (e.g., traffic signal 180, FIG. 1) and manages traffic flow within an area of pre-determined proximity of the traffic signal. In embodiments of the present invention, traffic optimization program 200 receives data associated with vehicles within incoming and exiting lanes of the optimization zone in real-time and performs a dynamic assessment of wait times and an allotted time for a go-signal to be provided to a selected lane or lanes to optimize vehicle wait time (i.e., minimizing overall wait times) within the optimization zone, such as optimization zone 185 (FIG. 1).

Traffic optimization program 200 detects vehicles within a pre-determined proximity of a traffic signal (step 210). Traffic optimization program 200 begins an iteration of the traffic signal and receives input on vehicles entering or already inside the optimization zone, where the optimization zone includes an area defined by pre-determined proximity to the traffic signal. In some embodiments, traffic optimization program 200 receives the input data from individual vehicles, for example, from a data transponder in respective vehicles that identifies the vehicle and provides information regarding the type of vehicle, the position of the vehicle in the optimization zone, and the lane associated with the vehicle's position, among other data items.

For example, passenger vehicle 121 enters optimization zone 185 for traffic signal 180 and transmits information to traffic optimization program 200 operating on computing device 110 that identifies passenger vehicle 121, indicates the position of passenger vehicle 121 in lane 167 relative to traffic signal 180, declares that there are 3 occupants in passenger vehicle 121, and provides a code indicating that an occupant of passenger vehicle 121 has made a payment to receive higher priority.

Traffic optimization program 200 identifies the incoming lanes being considered to receive a go-signal as candidate lanes (step 220). Traffic optimization program 200 determines the candidate lanes in the optimization zone which, in an embodiment, excludes the lane receiving the go-signal from the immediately previous iteration of the traffic signal. In the event the previous iteration did not provide a go-signal, such as due to congestion in all exiting lanes, traffic optimization program 200 considers all incoming lanes for the current iteration of providing a go-signal.

For example, traffic optimization program 200 identifies lanes 160, 162, 165, 167, 170, 172, 175, and 177 as incoming lanes to optimization zone 185. Traffic optimization program 200 determines that lanes 160 and 162 were provided the go-signal in the previous iteration of traffic signal 180, excludes lanes 160 and 162, and considers lanes 165, 167, 170, 172, 175, and 177 as candidate lanes for selection to receive a go-signal in the current iteration.

Traffic optimization program 200 calculates a prioritized overall lane wait time for incoming lanes (step 230). Traffic optimization program 200 calculates a prioritized wait time for each vehicle in respective lanes of optimization zone 185, which contributes to determining an overall lane wait time for each incoming lane of optimization zone 185. In embodiments of the present invention, traffic optimization program 200 determines a wait time for respective vehicles in an incoming lane, for all incoming lanes of optimization zone 185. In some embodiments, traffic optimization program 200 determines vehicle wait time by the difference between a current time and the time assigned to the respective vehicle's information when the vehicle entered optimization zone 185. In an alternate embodiment, traffic optimization program 200 determines a vehicle wait time from the time the vehicle enters optimization zone 185 until the vehicle leaves the zone, which can also be used to calculate target function optimization values.

Traffic optimization program 200 determines a priority proportion for the respective vehicles within the lane, for all incoming lanes of optimization zone 185. In some embodiments, vehicles receive a value in the range of 0 to 1 as the priority proportion, based on the vehicle type, which may be pre-configured. Other ranges of values for the priority proportion may be used if consistently applied. Calculating the product of the respective vehicle's wait time and the priority proportion of the respective vehicle results in the individual vehicle's prioritized wait time.

For example, to illustrate the above concepts, emergency vehicles 124 and 134 have priority proportions of 0.8, municipal, utility, and government vehicles have priority proportions of 0.6, public transit vehicles 122 and 132 have priority proportions of 0.3, commercial delivery vehicles (not shown in FIG. 1) have priority proportions of 0.2, and passenger vehicles 120, 121, 130, and 131 have priority proportion values of 0.1. A possible prioritized wait time for passenger vehicle 120 may be [90 sec. wait time]×[0.1 priority proportion]=9.0 prioritized wait time for passenger vehicle 120.

Traffic optimization program 200 determines the number of occupants in the vehicle, which can determine in part or in whole the vehicle's priority proportion or can be combined with the type of the vehicle to determine the priority proportion for the respective vehicle. For example, if the vehicle type precludes consideration of the number of occupants, then the respective vehicles rely on a pre-configured priority proportion value for the vehicle type. In another example, if the vehicle type does not preclude consideration of the number of occupants, then the number of occupants of the vehicle determines the vehicle's priority proportion. In some embodiments, traffic optimization program 200 recognizes an optional condition associated with the vehicle in which obtaining an increase in the priority proportion of the vehicle depends on payment of an amount by the owner or occupant of the vehicle or may be based on reward or incentive-based.

Traffic optimization program 200 calculates a prioritized overall lane wait time for each incoming lane within optimization zone 185, which combines the overall lane wait time with a lane priority proportion. Traffic optimization program 200 summarizes the prioritized vehicle wait times of all vehicles in a respective lane to calculate an overall lane wait time. The determination of a lane priority proportion includes consideration of multiple elements. The lane priority proportion considers the time that has transpired since each lane last received a go-signal, considers the amount of congestion in the exit lanes from optimization zone 185, also considers the rate of vehicles entering incoming lanes of optimization zone 185, and may further consider additional relevant aspects affecting the traffic flow of optimization zone 185. Traffic optimization program 200 determines the lane priority proportion, for example, by the calculation of [duration of time since the lane has received a go-signal]/[the largest time duration among all lanes since receiving a go-signal]. Incoming vehicle rate information can be transmitted to traffic optimization program 200 by vehicle transponders, detected by cameras or radar detection devices at perimeters of optimization zone 185. Traffic congestion of exit lanes can be provided from other traffic signal controlling devices outside optimization zone 185.

Traffic optimization program 200 considers exit lane congestion and may increase the priority proportion to lanes exiting vehicles into a free exit lane as opposed to adding to congestion issues detected in other exit lanes. An example embodiment of determining a prioritized overall lane wait time includes, but not limited to, [overall lane wait time]×[lane priority proportion] in which the lane priority proportion includes the duration of time since a lane received a go-signal and may consider exit lane congestion as well as other applicable factors.

For example, traffic optimization program 200 determines the wait times for each vehicle in each incoming lane of optimization zone 185 and determines the priority proportion for each vehicle, based on vehicle type and, in some instances, occupants in the respective vehicles. Traffic optimization program 200 calculates the prioritized vehicle wait time for all vehicles and summarizes the prioritized vehicle wait times for all vehicles within a lane to obtain the overall lane wait time. The product of the overall lane wait time and a lane priority proportion results in the prioritized overall lane wait time and provides the basis for the selection of a lane to receive a go-signal.

Traffic optimization program 200 selects the lane or lanes to receive the go signal in the current iteration of the traffic signal (step 240). In some embodiments, only lanes that did not receive a go-signal in the previous traffic signal iteration are considered. In one embodiment, the basis for the selection of lanes for the current iteration of the go-signal from traffic signal 180 includes selection of the lane(s) with the highest prioritized overall lane wait time. In some embodiments, traffic optimization program 200 determines additional lanes of optimization zone 185 that are not conflicting with the selected lane(s), and the additional non-conflicting lanes are included in the selection of lanes to receive the go-signal. In some embodiments, in which all exit lanes of optimization zone 185 are determined to be fully congested, traffic optimization program 200 maintains a stop-signal for all lanes for a short duration enabling reduction of exit lane congestion and may provide an all-way go-signal for pedestrian crossing during the vehicle all-way stop signal duration. In some embodiments, traffic optimization program 200 initiates a new iteration subsequent to the vehicle all-stop signal duration, which may coincide with detection of movement in exit lanes of optimization zone 185.

Traffic optimization program 200 determines an amount of time allotted to provide the go-signal to the selected lane or lanes (step 250), (hereafter, referred to as the singular "lane"). In one embodiment, traffic optimization program 200 calculates the number of vehicles in the selected lane to flush from the lane during the go-signal duration. Traffic optimization program 200 calculates an average prioritized signal wait time, which averages the prioritized vehicle wait time across all vehicles within optimization zone 185. Traffic optimization program 200 determines the number of vehicles to flush from the selected lane by determining the number of vehicles in the selected lane that has an actual wait time higher than the average prioritized signal wait time. If there are no vehicles in the selected lane that have an actual wait time higher than the average prioritized signal wait time, then traffic optimization program 200 determines the number of vehicles to flush from the selected lane by determining the number of vehicles that can fit into the available space in the exit lane corresponding to the selected lane.

In some embodiments, traffic optimization program 200 uses a go-signal time function that receives a number of vehicles to flush from the selected lane as input and returns the duration of time to provide the go-signal to the selected lane for the current iteration of traffic signal 180. The go-signal time function can be learned from historical vehicle throughput that captures the number of vehicles observed passing through the lane per unit of time. The historic data learning can be further improved by additional consideration of weather factors, the amount of congestion of exit lanes, information from other traffic signals, as well as the location and the physical topography of the optimization zone 185. In some embodiments, traffic optimization program 200 adjusts the go-signal time function to consider additional time to pass through optimization zone 185 by larger and longer vehicle types.

In some embodiments, the go-signal time function includes setting the time function with constants representing various time-per-vehicle passing through optimization zone 185. The constants can be set based on vehicle type, as well as the number of vehicles positioned ahead of respective vehicles in the lane, for example, each vehicle positioned before a particular vehicle in the selected lane adds time delays affecting when the particular vehicle crosses the position of the traffic signal. The constants can be adjusted based on ongoing feedback measurements. In some embodiments, the go-signal time function includes a configured minimum and maximum time duration for the go-signal. Traffic optimization program 200 determines the allotted time for providing the go-signal to the selected lane by inputting the number of vehicles to flush from the selected lane to the go-signal time function.

Traffic optimization program 200 provides the determined allotted go-signal time to the selected lanes and non-conflicting lanes (step 260). In some embodiments, traffic optimization program 200 provides the determined allotted go-signal time to additional lanes that do not conflict with the go-signal provided to the selected lane. Traffic optimization program 200 determines the expiration point of the go-signal allotted time and terminates the go-signal.

Traffic optimization program 200 collects metric measurements and updates parameters and functions for the next iteration of the traffic signal (step 270). Traffic optimization program 200 collects information associated with having flushed vehicles from the selected lane of optimization zone 185. Traffic optimization program 200 measures the actual vehicle throughput passing through traffic signal 180 into exit lanes of optimization zone 185 and compares the actual vehicle throughput to the target number of vehicles intended for flushing from optimization zone 185. In some embodiments traffic optimization program 200 updates the go-signal time function making adjustments as necessary based on the actual to target comparison. For example, traffic optimization program 200 may determine that some vehicle types are faster or slower passing through traffic signal 180 under certain conditions (i.e., poor weather conditions).

Traffic optimization program 200 performs measurements, collects metrics, records data, and updates the prioritized vehicle wait times for all vehicles in optimization zone 185 prior to initiating the next iteration of traffic signal 180. In some embodiments, traffic optimization program 200 modifies configuration parameters before initiating the next iteration, based on detection or received input of environmental conditions, such as weather, congestion, accidents, and discrepancies between expected and actual vehicles flushed, or parameters can be manually adjusted such as for planned construction in the vicinity of optimization zone 185. In some embodiments, traffic optimization program 200 modifies vehicle priority proportions per vehicle type based on environmental conditions. For example, infrastructure outages may lead to an increase of priority of utility vehicles, and attendance at local public events can increase priority for public transit vehicles.

Having completed an iteration of the traffic signal, collected metrics, and updated parameters, traffic optimization program 200 initiates a new iteration of traffic signal 180, in which a lane other than the lane selected in the previous iteration will be selected and a new calculated allotment of time assigned to the go-signal for the selected lane.

Embodiments of the present invention include detection of emergency vehicles in emergency mode entering the optimization zone at any point during the above-recited steps of traffic optimization program 200. Traffic optimization program 200 initiates an emergency state associated with the optimization zone and adjusts the traffic signal operation to provide top priority to the lanes in which the emergency vehicles are located. Traffic optimization program 200 enables flushing of the lanes that include the emergency vehicles until the emergency vehicles have passed through the traffic signal and have entered exit lanes of the optimization zone. In some embodiments, traffic optimization program 200 maintains an additional time interval of the emergency state after the emergency vehicles are flushed from the incoming lane and have passed the traffic signal. The additional emergency state interval anticipates situations in which additional emergency vehicles may soon enter the optimization zone. Traffic optimization program 200 initiates the emergency state as a temporary state lasting until the emergency vehicles are flushed and past the traffic signal and any additional time interval of the emergency state has expired.

Figure 3:
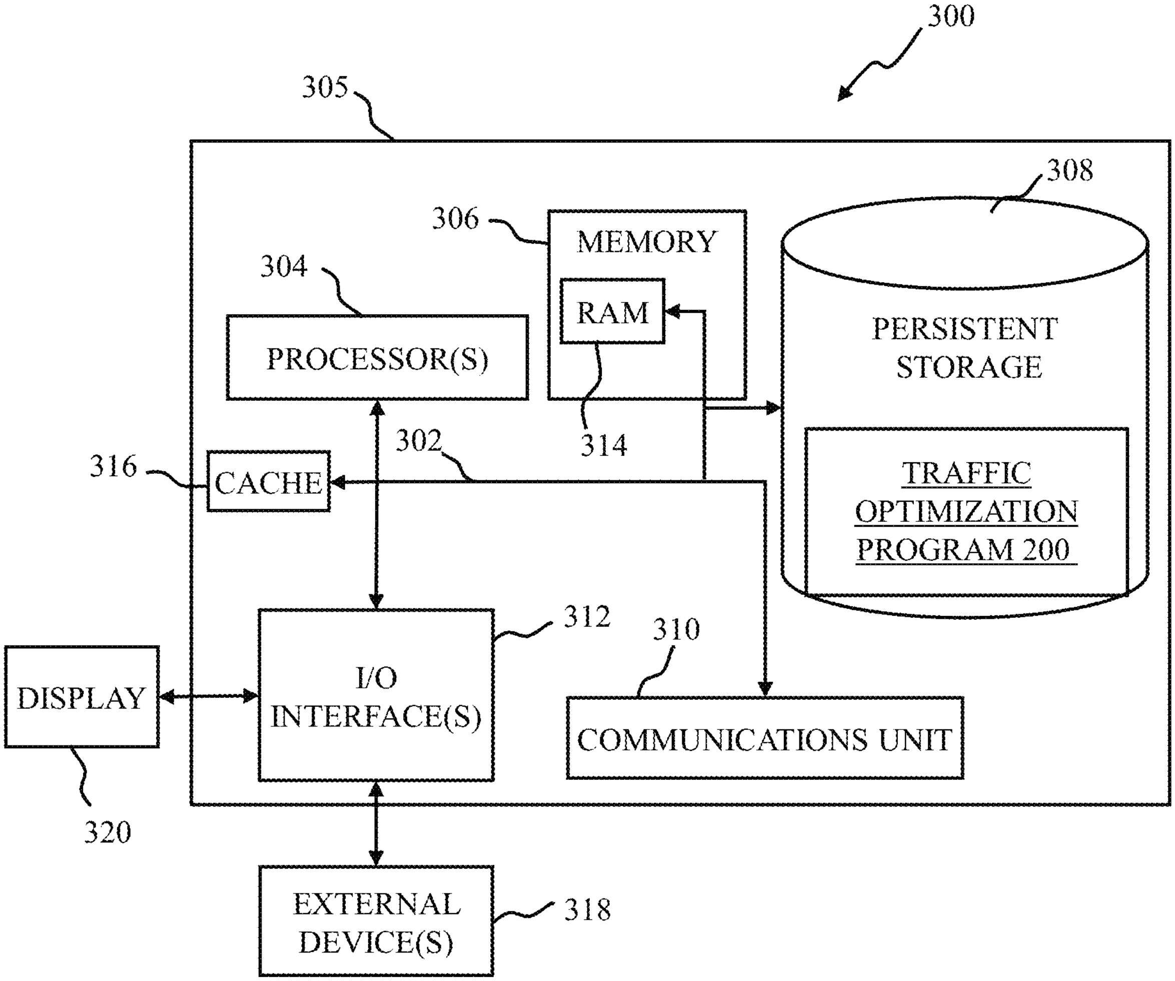
FIG. 3 depicts a block diagram of components of a computing system, including a computing device configured to operationally perform the traffic optimization program of FIG. 2, in accordance with an embodiment of the present invention.

FIG. 3 depicts a block diagram of components of computing system 300, including computing device 305, configured to include or operationally connect to components depicted in FIG. 1, and with the capability to operationally perform traffic optimization program 200 of FIG. 2, in accordance with an embodiment of the present invention.

Computing device 305 includes components and functional capability similar to components of computing device 110 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, an input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer-readable storage media. In this embodiment, memory 306 includes random access memory (RAM) 314. In general, memory 306 can include any suitable volatile or non-volatile computer-readable storage media.

In one embodiment traffic optimization program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of distributed computer processing environment 100. In these examples, communications unit 310 includes one or more network interface cards. Communications unit 310 may provide communications through the use of either or both physical and wireless communications links. Traffic optimization program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., traffic optimization program 200 can be stored on such portable computer-readable storage media and can be loaded onto persistent storage 308 via I/O interface(s) 312. I/O interface(s) 312 also connects to a display 320.

Display 320 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

detecting, by one or more processors of a computer device, a plurality of vehicles included within a predetermined proximity of a traffic signal;

identifying, by the one or more processors of the computer device, a plurality of incoming lanes to the pre-determined proximity of the traffic signal as a plurality of candidate lanes to receive a go-signal from the traffic signal;

calculating, by the one or more processors of the computer device, a set of metrics for the plurality of candidate lanes including a prioritized overall lane wait time for each candidate lane from the plurality of candidate lanes associated with the traffic signal;

selecting, by the one or more processors of the computer device, at least one candidate lane from the plurality of candidate lanes to receive the go-signal based on the set of metrics;

determining, by the one or more processors of the computer device, an average prioritized signal wait time for vehicles in the pre-determined proximity of the traffic signal;

determining, by the one or more processors of the computer device, as a number of vehicles to flush, a number of vehicles in the at least one candidate lane that has an actual wait time higher than the average prioritized signal wait time;

calculating, by the one or more processors of the computer device, an amount of allocated time to present the go-signal, based on the number of vehicles to flush from the at least one candidate lane;

initiating, by the one or more processors of the computer device, the go-signal to the at least one candidate lane for a duration of the allocated time; and updating, by the one or more processors of the computer device, the set of metrics.

2. The method of claim 1, wherein calculating the amount of time to allocate to the go-signal further comprises:

calculating, by the one or more processors of the computer device, the amount of time to flush the number of vehicles from the at least one candidate lane, based on a time function of historical vehicle throughput per unit of time; and including, by the one or more processors of the computer device, additional considerations of weather factors, congestion of exit lanes and physical topography of the pre-determined proximity of the traffic signal.

3. The method of claim 1, further comprising:

presenting, by the one or more processors of the computer device, the go-signal and the allocated time to lanes that are non-conflicting with the at least one candidate lane.

4. The method of claim 1, wherein the prioritized overall lane wait time is based on a prioritized vehicle wait time of vehicles within a lane and a priority proportion for the lane, and wherein a priority associated with a respective vehicle is based on a type of the respective vehicle, and a number of occupants in the respective vehicle, and wherein the prioritized vehicle wait time is measured from a time the respective vehicle enters the pre-determined proximity of the traffic signal to a current time.

5. The method of claim 1, wherein updating the set of metrics further comprises:

determining, by the one or more processors of the computer device, the plurality of candidate lanes for a next iteration of initiating the go-signal;

identifying, by the one or more processors of the computer device, additional vehicles in the pre-determined proximity of the traffic signal subsequent to flushing of vehicles from the selected lanes at least one candidate lane;

determining, by the one or more processors of the computer device, prioritized vehicle wait times and priority proportions for the vehicles in the pre-determined proximity of the traffic signal subsequent to vehicle flushing from at least one candidate lane; and determining, by the one or more processors of the computer device, an overall lane wait time and lane priority proportion for next candidate lanes for the next iteration of initiating the go-signal from the traffic signal.

6. The method of claim 5, wherein collecting the set of metrics further comprises:

comparing, by the one or more processors of the computer device, an actual throughput of vehicles during an allotted time of the go-signal to a target number of vehicles to flush from the at least one candidate lane; and updating, by the one or more processors of the computer device, a time-per-vehicle metric used for calculating the allotted time of the go-signal.

7. The method of claim 1, wherein selecting the at least one candidate lane from the plurality of candidate lanes is based on optimizing a target function that minimizes overall wait times of the vehicles in incoming lanes of the pre-determined proximity of the traffic signal.

8. The method of claim 1, further comprising:

determining, by the one or more processors of the computer device, an emergency vehicle in an emergency mode in an incoming lane of the pre-determined proximity of the traffic signal;

initiating, by the one or more processors of the computer device, an emergency state for the traffic signal; and assigning, by the one or more processors of the computer device, high priority to lanes the incoming lane with the emergency vehicle.

9. The method of claim 1, wherein calculating the amount of allocated time to present the go-signal further comprises:

determining, by the one or more processors of the computer device, a time for a vehicle of a vehicle type receiving the go-signal to pass through the traffic signal, based on historical vehicle throughput data;

determining, by the one or more processors of the computer device, a vehicle type for respective vehicles in the at least one candidate lane to be flushed in a current iteration;

determining, by the one or more processors of the computer device, a number of vehicles to flush from the at least one candidate lane; and initiating, by the one or more processors of the computer device, the go-signal to the at least one candidate lane corresponding to the time determined for the vehicle type to pass through the traffic signal for each vehicle of the number of vehicles to flush from the at least one candidate lane in the current iteration of the traffic signal.

10. The method of claim 1, wherein the amount of allotted time for the go-signal includes considering one or a combination selected from the group consisting of: conditions at a location of the traffic signal, a topography of the pre-determined proximity of the traffic signal, and an amount of congestion in a plurality of exiting lanes in the pre-determined proximity of the traffic signal.

11. The method of claim 1, further comprising:

determining, by the one or more processors of the computer device, information regarding the vehicles within the pre-determined proximity of the traffic signal by using one or a combination selected from the group consisting of: sensors, cameras, radar, and wireless transmission from the vehicles.

12. A computer system comprising:

one or more computer processors;

one or more computer-readable storage media, and program instructions stored on the one or more computer-readable storage media, the program instructions comprising:

program instructions to detect a plurality of vehicles included within a pre-determined proximity of a traffic signal;

program instructions to identify a plurality of incoming lanes to the pre-determined proximity of the traffic signal as a plurality of candidate lanes to receive a go-signal from the traffic signal;

program instructions to calculate a set of metrics for the plurality of candidate lanes including a prioritized overall lane wait time for each candidate lane from the plurality of candidate lanes associated with the traffic signal;

program instructions to select at least one candidate lane from the plurality of candidate lanes to receive the go-signal based on the set of metrics;

program instructions to determine an average prioritized signal wait time for vehicles in the pre-determined proximity of the traffic signal;

program instructions to determine, as a number of vehicles to flush, a number of vehicles in the at least one candidate lane that has an actual wait time higher than the average prioritized signal wait time;

program instructions to calculate an amount of allocated time to present the go-signal, based on the number of vehicles to flush from the at least one candidate lane;

program instructions to initiate the go-signal to the at least one candidate lane for a duration of the allocated time; and program instructions to update the set of metrics.

13. The computer system of claim 12, wherein updating the set of metrics further comprises:

program instructions to compare an actual throughput of the vehicles during an allotted time of the go-signal to a target number of the vehicles to flush from the at least one candidate lane;

program instructions to determine the plurality of candidate lanes for a next iteration of initiating the go-signal;

program instructions to identify additional vehicles in the pre-determined proximity of the traffic signal subsequent to flushing of vehicles from the at least one candidate lane;

program instructions to determine prioritized vehicle wait times and priority proportions for the vehicles in the pre-determined proximity of the traffic signal subsequent to vehicle flushing from the at least one candidate lane; and program instructions to determine an overall lane wait time and lane priority proportion for next candidate lanes for the next iteration of presenting the go-signal from the traffic signal.

14. The computer system of claim 12, wherein program instructions to calculate the prioritized overall lane wait time is based on a prioritized vehicle wait time of vehicles within a lane and a priority proportion for the lane, and wherein a priority associated with a respective vehicle is based on a type of the respective vehicle, and a number of occupants in the respective vehicle, and wherein the prioritized vehicle wait time is measured from a time the respective vehicle enters the pre-determined proximity of the traffic signal to a current time.

15. The computer system of claim 12, wherein program instructions to calculate an amount of allocated time to present the go-signal further comprise:

program instructions to determine a time for a vehicle of a vehicle type receiving the go-signal to pass through the traffic signal, based on historical vehicle throughput data;

program instructions to determine the vehicle type for respective vehicles in the at least one candidate lane to be flushed in a current iteration;

program instructions to determine a number of the vehicles to flush from the at least one candidate lane; and program instructions to initiate the go-signal to the at least one candidate lane corresponding to the time for the vehicle type to pass through the traffic signal for each vehicle of the number of vehicles to flush from the at least one candidate lane in the current iteration of the traffic signal.

16. The computer system of claim 12, wherein program instructions to calculate the amount of time to allocate to the go-signal further comprises:

program instructions to calculate the amount of time to flush the number of vehicles from the at least one candidate lane, based on a time function of historical vehicle throughput per unit of time; and program instruction to including additional considerations of weather factors, congestion of exit lanes and physical topography of the pre-determined proximity of the traffic signal.

17. The computer system of claim 12, further comprising:

program instructions to present the go-signal and the allocated time to lanes that are non-conflicting with the at least one candidate lane.

18. The computer system of claim 12, further comprising:

program instructions to determine an emergency vehicle in an emergency mode in an incoming lane of the pre-determined proximity of the traffic signal;

program instruction to initiate an emergency state for the traffic signal; and program instructions to assign high priority to the incoming lane with the emergency vehicle.

19. The computer system of claim 12, wherein the amount of allotted time for the go-signal includes considering one or a combination selected from the group consisting of:

conditions at a location of the traffic signal, a topography of the pre-determined proximity of the traffic signal, and an amount of congestion in a plurality of exiting lanes in the pre-determined proximity of the traffic signal.

20. The computer system of claim 12, further comprising:

program instructions to determine information regarding the vehicles within the pre-determined proximity of the traffic signal by using one or a combination selected from the group consisting of: sensors, cameras, radar, and wireless transmission from the vehicles.

* * * * *